US010203091B2

(12) United States Patent
Luo (10) Patent No.: US 10,203,091 B2
(45) Date of Patent: Feb. 12, 2019

(54) MOTOR VEHICLE LIGHTING SYSTEM AND MOTOR VEHICLE (71) Applicant: VALEO VISION, Bobigny (FR)

(72) Inventor: Weicheng Luo, Bobigny (FR)

(*) Notice: Subject to any disclaimer, the term of this patent is extended or adjusted under 35 U.S.C. 154(b) by 0 days.

(21) Appl. No.: 15/721,033

(22) Filed: Sep. 29, 2017

(65) Prior Publication Data
US 2018/0087747 A1 Mar. 29, 2018

(30) Foreign Application Priority Data

Sep. 29, 2016 (FR) ...................................... 16 59299
Sep. 29, 2016 (FR) ...................................... 16 59306

(51) Int. Cl.
| F21V 14/04 | (2006.01) |
| F21V 5/04 | (2006.01) |
| F21V 5/00 | (2018.01) |
| F21V 7/08 | (2006.01) |
| G02B 26/08 | (2006.01) |
| G02B 26/10 | (2006.01) |
| F21S 41/675 | (2018.01) |
| F21S 41/147 | (2018.01) |
| F21S 41/24 | (2018.01) |

(Continued)

(52) U.S. Cl.
CPC ............ F21V 14/04 (2013.01); F21S 41/147 (2018.01); F21S 41/24 (2018.01); F21S 41/26 (2018.01); F21S 41/322 (2018.01); F21S 41/675 (2018.01); F21V 5/002 (2013.01); F21V 5/04 (2013.01); F21V 7/08 (2013.01); G02B 26/0833 (2013.01); G02B 26/105 (2013.01); F21Y 2115/10 (2016.08)

(58) Field of Classification Search
None
See application file for complete search history.

(56) References Cited

U.S. PATENT DOCUMENTS 5,219,445 A * 6/1993 Bartenbach ........... F21V 7/0008
359/851
7,460,305 B2 * 12/2008 Powell ................... G02B 13/22
348/E9.026

(Continued)

FOREIGN PATENT DOCUMENTS

EP 1 433 654 A2 6/2004

OTHER PUBLICATIONS

French Preliminary Search Report dated Apr. 25, 2017 in French Application 16 59299 filed on Sep. 29, 2016 (with English Translation of Categories of cited documents).

Primary Examiner — Ashok Patel
(74) Attorney, Agent, or Firm — Oblon, McClelland, Maier & Neustadt, L.L.P.

(57) ABSTRACT

A motor vehicle lighting system including: a lighting device capable of emitting a light beam, a projection device having a projection lens, and an array of micro-mirrors having micro-mirrors mounted in a pivoting manner about a pivot axis. Each micro-mirror is capable of pivoting to the maximum by an angle, referred to as the maximum pivoting angle. The light beam emitted by the lighting device exhibits an angle at the upper vertex greater than the maximum pivoting angle and wherein the at least one projection lens viewed in a frontal section has the form of a rectangle having a longitudinal side extending in a direction that is substantially parallel to the pivot axis of the micro-mirrors.

20 Claims, 5 Drawing Sheets (51) Int. Cl.
*F21S 41/26* (2018.01)
*F21S 41/32* (2018.01)
*F21Y 115/10* (2016.01)

(56) References Cited

U.S. PATENT DOCUMENTS

| | | | |
|---|---|---|---|
| 8,520,058 B2 * | 8/2013 | Rodrigue | G01B 11/245 |
| | | | 348/46 |
| 2004/0189447 A1 | 9/2004 | Okubo et al. | |
| 2007/0147055 A1 | 6/2007 | Komatsu | |
| 2009/0046474 A1 | 2/2009 | Sato et al. | |
| 2011/0292669 A1 | 12/2011 | Albou et al. | |
| 2016/0195232 A1 | 7/2016 | Boinet | |

* cited by examiner

MOTOR VEHICLE LIGHTING SYSTEM AND MOTOR VEHICLE

The present invention relates to the field of motor vehicle lighting systems.

In particular, the present invention relates to a lighting system capable of simultaneously combining the function of road lighting and the function of projecting an image onto the road.

Document EP 1 433 654 describes a digital display apparatus capable of being used in a motor vehicle lighting system to guarantee these two functions. This apparatus is based on a technology that uses an array of micro-mirrors. This technology provides good definition but low light output.

In fact, according to this technology, each micro-mirror is capable of tilting about a pivot axis between three positions at a fixed angle. In a first angular position, the light beam is reflected towards a projection device. In a second angular position, the light beam is reflected towards a light absorption device. The third angular position is midway between the first angular position and the second angular position. This intermediate angular position is unstable. It is not therefore used. The maximum pivoting angle $2\alpha$ existing between the first angular position and the second angular position is generally equal to 12° or to 20°.

The light beam reflected by the array of micro-mirrors forms a light cone having an angle at the vertex equal to the maximum pivoting angle $2\alpha$ of the micro-mirrors. The projection device must be disposed in the light cone formed by the light beam at the outlet of the array of micro-mirrors. Since the angle at the vertex is relatively small, the light output of the lighting system is also relatively low when the intention is to maintain a high level of contrast.

The aim of the present invention is to propose a motor vehicle lighting system which has good definition, a high level of contrast and a high light output.

To this end, the object of the invention is a motor vehicle lighting system comprising:
  a lighting device capable of emitting a light beam,
  a projection device comprising at least one projection lens,
  an array of micro-mirrors comprising micro-mirrors mounted in a pivoting manner about a pivot axis, said micro-mirrors being capable of receiving at least part of the light beam emitted by the lighting device and of reflecting at least part of the light beam along a projection axis about a projection axis in the direction of the projection device, each micro-mirror being capable of pivoting to the maximum by an angle, this being referred to as the maximum pivoting angle,
  characterized in that the light beam emitted by the lighting device exhibits an angle at the vertex greater than the maximum pivoting angle and in which the at least one projection lens viewed in a frontal section has the form of a rectangle having a longitudinal side extending in a direction that is substantially parallel to the pivot axis of the micro-mirrors.

According to the particular embodiments, the lighting system according to the invention comprises one or a plurality of the following characteristics:
  the angle at the vertex of the light beam emitted by the lighting device is equal to at least 1.3 times the maximum pivoting angle of the micro-mirrors, the at least one projection lens exhibiting in frontal section a lateral side, the size of the longitudinal side of the frontal section of the lens being greater than or equal to 1.3 times the size of the lateral side of the frontal section of the at least one projection lens;
  the angle at the vertex of the light beams emitted by the lighting device is at least equal to twice the maximum pivoting angle of the micro-mirrors, the at least one projection lens exhibiting in frontal section a lateral side, and wherein the size of the longitudinal side of the frontal section of the at least one projection lens is roughly equal to twice the size of the lateral side of the frontal section of the at least one projection lens;
  the light beam reflected by the micro-mirrors exhibits a first aperture angle according to a main direction and a second aperture angle different from the first aperture angle in a secondary direction, the second aperture angle being different from the first aperture angle and wherein said secondary direction is perpendicular to the pivot axes of the micro-mirrors and perpendicular to the projection axis, said main direction being parallel to the pivot axes;
  the first aperture angle is at least equal to 1.3 times the second aperture angle;
  said first aperture angle is substantially equal to twice the second aperture angle;
  the lighting device comprises a first light source capable of emitting light beams extending about a first lighting axis aimed in the direction of the array of micro-mirrors and a second light source capable of emitting light beams extending about a second lighting axis aimed in the direction of the array of micro-mirrors, the first lighting axis and the second lighting axis being disposed in a same lighting plane, an angle substantially equal to the maximum pivoting angle of the micro-mirrors being defined between the lighting plane and the projection axis;
  the first lighting axis exhibits a lighting angle with said second lighting axis, said lighting angle being substantially lower than or equal to twice said maximum pivoting angle;
  the lighting device comprises a light source capable of emitting a light beam, an ellipsoidal reflector capable of reflecting the light beam to create a light beam with an aperture angle equal to twice the maximum pivoting angle, a folding unit capable of folding the light beam reflected by the reflector, in order to generate a beam having an aperture angle equal to twice the maximum pivoting angle in a first direction and an aperture angle equal to the maximum pivoting angle in a second direction perpendicular to the first direction and a converging lens capable of receiving the light beam reflected by the reflector and the folding unit;
  said converging lens is located at least at a predefined distance from the focal point of the ellipsis formed by the reflector and from the array of micro-mirrors, the predefined distance being equal to twice the focal distance of the converging lens.

The present invention likewise relates to a motor vehicle comprising a lighting system defined by the characteristics mentioned above.

The invention will be better understood on reading the following description provided simply by way of example and written with reference to the figures in which.

In the present description, the term "vertical" is defined as being a direction parallel to the direction of the gravitational force. The term "horizontal" is defined as being a direction perpendicular to the direction of the gravitational force.

The present invention is described in the figures and in the description with respect to a direct benchmark (X, Y, Z) such as that usually defined in the automotive industry. In this benchmark (X, Y, Z), the vehicle moves in the negative direction of the X axis, the Y axis corresponds to the longitudinal axis of the vehicle and the Z axis extends from the bottom to the top of the vehicle.

Figure 1:
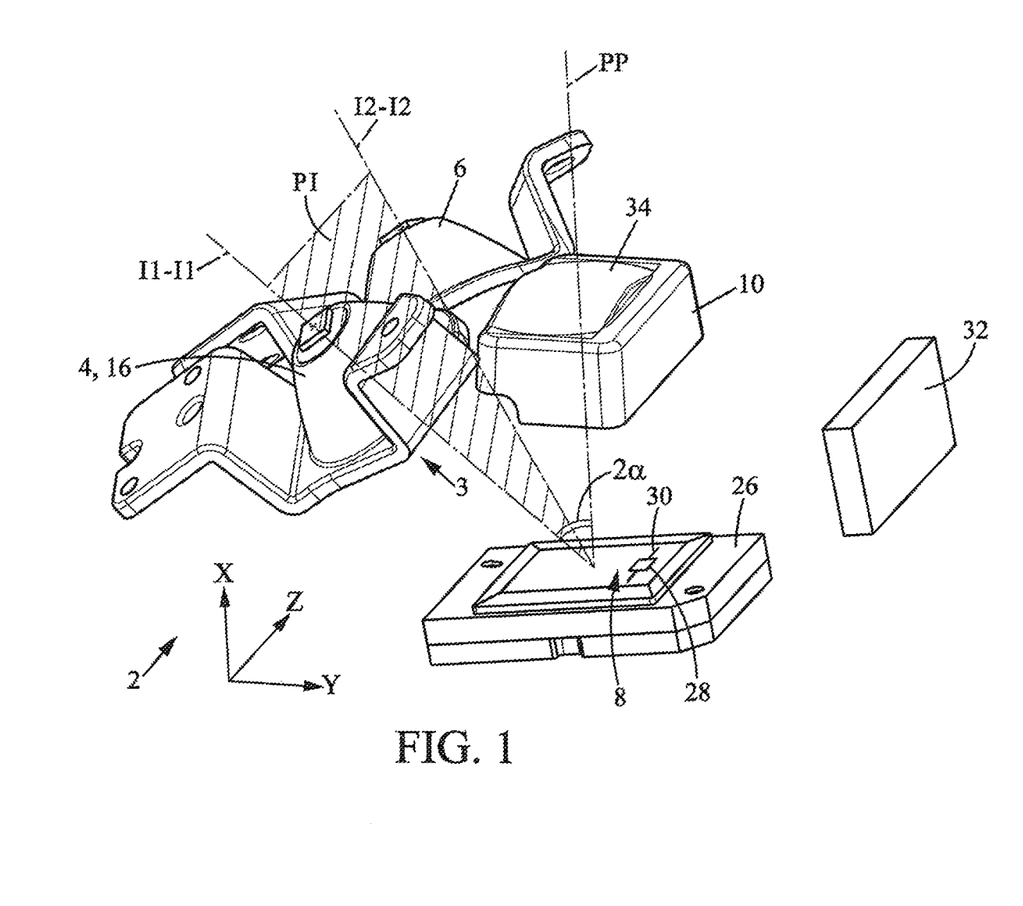
FIG. 1 is a perspective view of the lighting system according to the present invention, this lighting system comprises a lighting device according to a first embodiment.

With reference to FIG. 1, the motor vehicle lighting system 2 comprises a lighting device 3 capable of emitting a light beam, an array 8 of micro-mirrors capable of receiving at least part of the light beam emitted by the lighting device 3 and of reflecting at least part thereof, and a projection device 10 capable of receiving at least part of the light beam reflected by the array and projecting it onto the road.

The array 8 of micro-mirrors is capable of receiving at least part of the light beam emitted by the lighting device and reflecting at least part of it towards the projection device 10.

The array 8 of micro-mirrors is generally designated using the acronym DMD (Digital Micro-Mirror Device). With regard to FIG. 1, the array 8 generally exhibits the form of a rectangle or square. It comprises a support 26 and a large number of micro-mirrors 28 fixed to the support. In the array 8, the micro-mirrors 28 are distributed over the lines and columns. The number of micro-mirrors 28 is, for example, equal to 720×480=345 600, 800×600=480 000, 1024×768=786 432, 1280×1024=1 310 720 or a different number. A single micro-mirror has been depicted schematically in FIG. 1.

Each micro-mirror 28 comprises a semi-conductor substrate fixed to the support 26, a pivoting arm supported by the semi-conductor substrate and a micro-mirror component supported by the pivoting arm and adapted to pivot about a pivot axis 30. In particular, each micro-mirror 28 is capable of pivoting about a maximum pivoting angle $2\alpha$. The maximum pivoting angle $2\alpha$ is characteristic of the array of micro-mirrors. It is defined in the specifications of the array. It is generally equal to 12° or 20°. All pivot axes 30 of the array are mounted parallel to one another and parallel to a side of the rectangle formed by the array. In the embodiment of the present invention shown on the pictures, the pivot axes 30 are parallel to the short side of the array. In the depicted embodiment, when considering the normal mounting order of the lighting system in a motor vehicle, the pivot axes 30 are substantially vertically oriented, i.e. vertical more or less 10 degrees.

Figure 2:
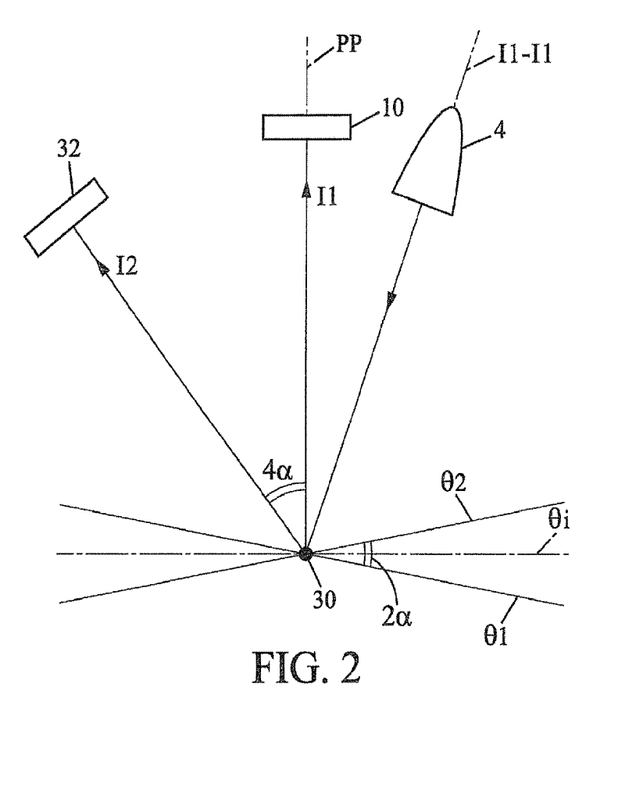
FIG. 2 is a schematic view explaining the operation of an array of micro-mirrors.

With reference to FIG. 2, each micro-mirror 28 is tilted individually about the pivot axis 30 upon receipt of an electric control transmitted by a control unit which is not shown. Each micro-mirror 28 can thereby pivot between a first angular position $\theta 1$ in which the micro-mirror 28 reflects the light beam I1 towards the projection device 10 and a second angular position $\theta 2$ in which the micro-mirror 28 reflects the light beam I2 towards an absorption component of the light 32, such as, for example, a sheet-metal wall. The angle defined between the first angular position $\theta 1$ and the second angular position $\theta 2$ is the maximum pivoting angle of the micro-mirrors $2\alpha$.

When all the micro-mirrors 28 of the array 8 are in the first angular position et the light beam I1 reflected by the array extends in a preferential direction substantially towards the center of the projection device 10. This preferential direction is referred to in the present patent application as the projection axis P-P. This axis is substantially parallel to the X axis.

By tilting certain micro-mirrors in the first angular position $\theta 1$ and other micro-mirrors in the second angular position $\theta 2$, a pattern is projected onto the road.

Each micro-mirror 28 can likewise be pivoted in an intermediate angular position $\theta i$ in which the micro-mirror is parallel to the mean plane of the support 26. The intermediate angular position $\theta i$ is not selected by the control unit as it is unstable.

The projection device 10 comprises a projection lens 34 realized in a plastic material and/or in glass.

Figure 3:
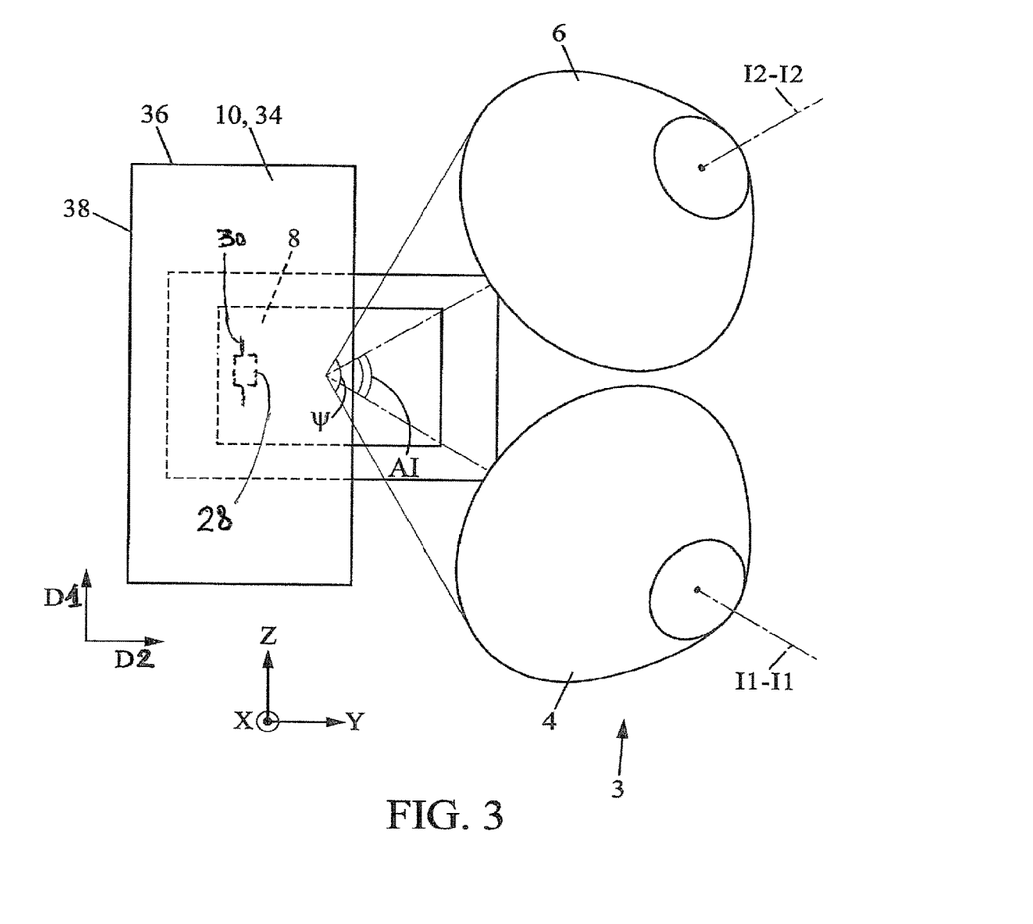
FIG. 3 is a schematic front view of the lighting system illustrated in FIG. 1.

With reference to FIG. 3, the projection lens 34 has an optical axis (not shown) that is parallel to the X axis or the projection axis P-P, preferably confused with the latter. The projection lens 34 extends in an intersecting plane with the optical axis, preferably perpendicularly. In a frontal section plane, that is a plane perpendicular to the optical axis cutting through the lens, the projection lens 34 exhibits a rectangular form, having a longitudinal side extending in a direction substantially parallel, preferably parallel, to the pivot axis 30 of the micro-mirrors 28. By substantially parallel it is meant here parallel, more or less 10 degrees. When considering the normal mounting order of the lighting device 3 in the lighting system once mounted in a motor vehicle, this direction is substantially vertical, i.e. vertical more or less 10 degrees.

Advantageously, in the embodiment shown, the size of the longitudinal side 38 of the frontal section of the projection lens is equal to 2 times the size of the lateral side 36 of the frontal section of the projection lens.

Alternatively, the size of the longitudinal side 38 of the frontal section of the projection lens is greater than or equal to 1.3 times the size of the lateral side 36 of the frontal section of the projection lens.

Alternatively, the projection device comprises two projection lenses combined in a doublet, both lense exhibiting a frontal section with a rectangular form having a longitudinal side extending in a direction substantially parallel, preferably parallel, to the pivot axis 30 of the micro-mirrors 28. These projection lenses are generally referred to as the input lens and the output lens. The input lens is generally a converging lens. It is capable of receiving the light beam coming from the array of micro-mirrors. This variant is particularly advantageous when the light source is monochromatic, for example a red, green, etc. LED light source. The lens doublet serves to balance out chromatic aberrations in white light.

According to the present invention, substantial lighting of the lateral sections can be obtained even with a projection lens elongated parallel to the pivot axis of the micro-mirror, when the light output is sufficient. The light output is increased in the present invention through the association of an output lens extending vertically and a lighting device capable of illuminating the micro-mirror array with a light cone having a wider angle at the vertex ψ. According to the present invention, this angle at the vertex ψ is measured at the point of convergence.

In particular, the light beam emitted by the lighting device 3 exhibits an angle at the vertex ψ that is greater than the maximum pivoting angle 2α.

Figure 4:
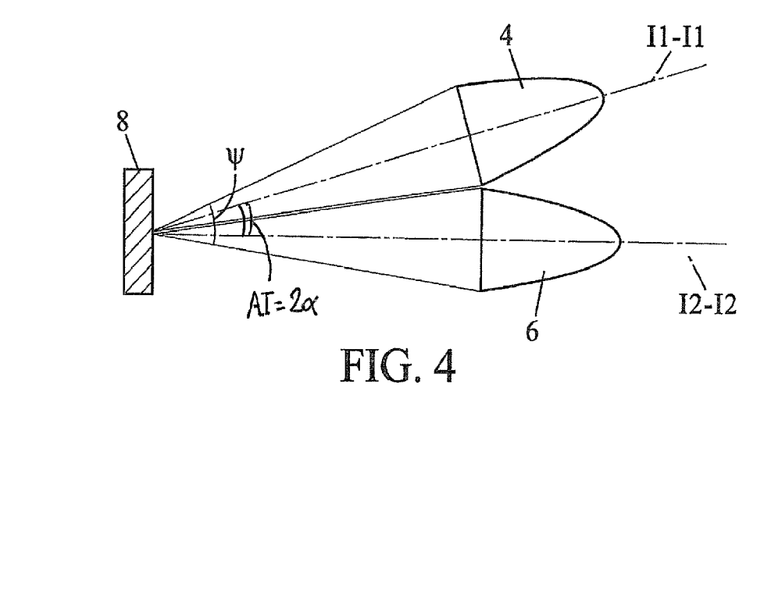
FIG. 4 is a schematic sectional view of part of the lighting system illustrated in FIG. 1, said section being realized in the lighting plane PI.

In the embodiment depicted in FIGS. 3 and 4, the angle at the vertex ψ of the light beam emitted by the lighting device 3 is equal to twice the maximum pivoting angle 2α of the micro-mirrors.

Alternatively, the angle at the vertex ψ of the light beam emitted by the lighting device 3 is equal to at least 1.3 times the maximum pivoting angle 2α of the micro-mirrors.

In order to realize this incident light cone, having a wider angle at the vertex ψ, the lighting device 3 of the lighting system according to the first embodiment of the invention comprises a first light source 4 capable of emitting a light beam which extends in a preferential direction referred to as the first lighting axis I1-I1 and a second light source 6 capable of emitting a light beam which extends in another preferential direction referred to as the second lighting axis I2-I2.

The light rays coming from the first light source 4 form a symmetrical light beam in respect of the first lighting axis I1-I1. The light rays coming from the second light source 6 form a symmetrical light beam in respect of the second lighting axis I2-I2.

Advantageously, the first I1-I1 and second I2-I2 lighting axes are substantially secant in the plane formed by the array of micro-mirrors, in such a manner that the lighting of the array of micro-mirrors exhibits two different local maximums.

According to a second aspect of the embodiment of the invention illustrated in FIGS. 1 to 6, the first lighting axis I1-I1 and the second lighting axis I2-I2 are disposed in a same lighting plane P1. This lighting plane PI is illustrated in FIG. 1 by cross-hatching. An angle substantially equal to the maximum pivoting angle 2α of the micro-mirrors is defined between the lighting plane PI and the projection axis P-P.

The individual positioning of the first light source 4 and the second light source 6 in a same lighting plane PI advantageously allows the light output to be increased, while maintaining an angle roughly equal to twice the maximum pivoting angle 2α between the projection device 10 and the absorption component of the light 32, as this is intrinsically required by the operating principle of the array of micro-mirrors.

The first lighting axis I1-I1 exhibits a lighting angle AI with the second lighting axis I2-I2.

This lighting angle AI is greater than twice the maximum pivoting angle 2α.

This lighting angle AI is preferably equal to twice the maximum pivoting angle 2α.

Figure 5:
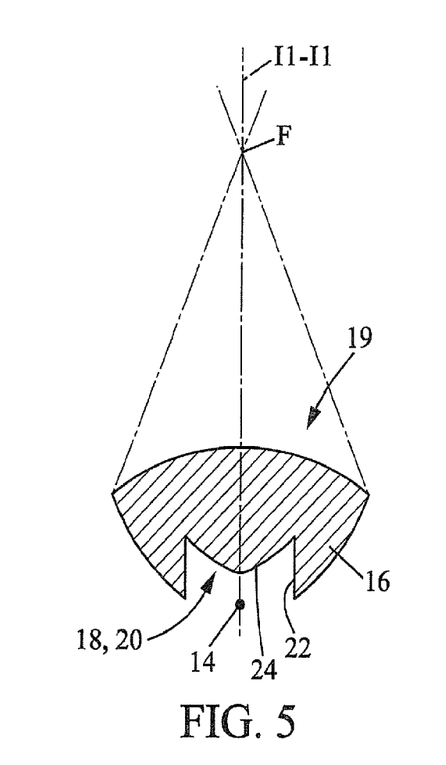
FIG. 5 is a schematic sectional view of a light source of the lighting device illustrated in FIG. 1.

The first light source 4 comprises a light-emitting diode 14 and a collimator 16. With reference to FIG. 5, the collimator 16 is capable of focusing the light rays emitted by the light-emitting diode 14 towards a focal point F. The array of micro-mirrors 8 is disposed a few centimeters upstream or downstream of the focal point F. FIG. 2 represents schematically a possible embodiment of the collimator 16. According to this embodiment, the collimator 16 is a revolving part having an input face 18 of the light rays and an output face 19 of the light rays. The input face 18 comprises a cavity 20 delimited by two lateral walls 22 and a convex base wall 24 pointing in the direction of the light-emitting diode 14. In this figure, the light-emitting diode 14 has been represented schematically by a dot. The emitting surface of the light-emitting diode 14 is arranged facing or inside the cavity 20. The output face 19 of the collimator is convex and aimed in an opposite direction to the light-emitting diode 14.

The second light source 6 is similar to the first light source 4 and will not be described in detail.

Figure 6:
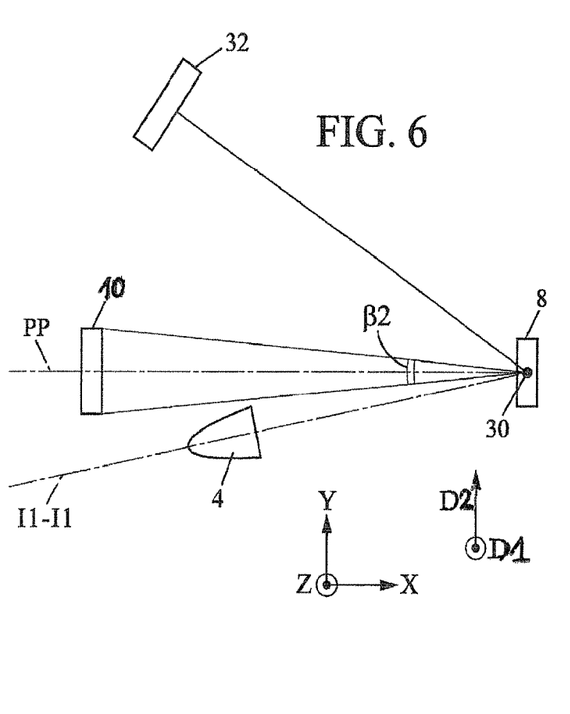
FIG. 6 is a schematic view from above of the lighting system illustrated in FIG. 1.

With reference to FIG. 6, the light beam reflected by the micro-mirrors 28 exhibits a first aperture angle β1 in a direction referred to as the main direction D1, and a second aperture angle β2 that differs from the first aperture angle β1 in a direction perpendicular to the main direction, referred to as the secondary direction D2. The second aperture angle β2, as well as the main direction D1 and the secondary direction D2, have been depicted in FIG. 6. The second aperture angle β1 has not been depicted.

The secondary direction D2 is perpendicular to the pivot axes 30 of the micro-mirrors and perpendicular to the projection axis P-P. The main direction D1 is parallel to the pivot axes 30.

In the embodiment illustrated in the figures, the main direction D1 extends along the Z axis of the benchmark (X, Y, Z) and the secondary direction D2 extends along the Y axis of the benchmark (X, Y, Z). When considering the normal mounting order of the lighting system in a motor vehicle, the main direction D1 is substantially vertical.

A lighting device 39 according to a second embodiment may likewise by used in the lighting system 2 according to the present invention.

Figure 7:
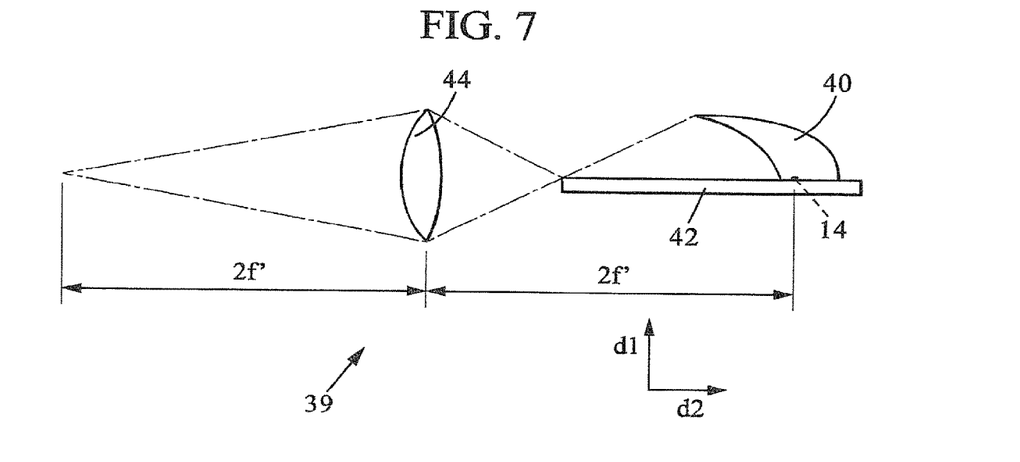
FIG. 7 is a schematic side view of a lighting device according to a second embodiment of the invention.
Figure 8:
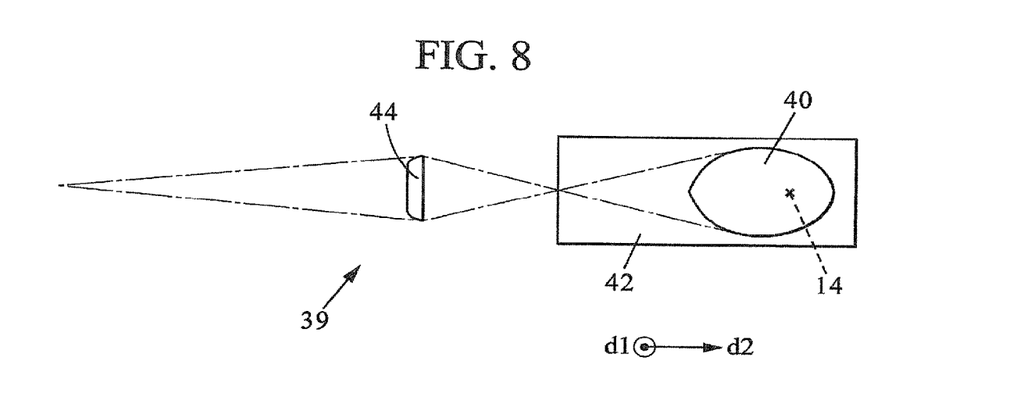
FIG. 8 is a schematic view from above of the lighting device according to the second embodiment of the invention.

With reference to FIGS. 7 and 8, the lighting device 39 comprises:

- a light-emitting diode 14 capable of emitting a semi-Lambertian light beam,
- a reflector 40 having an ellipsoidal form which is capable of reflecting the light beam to form a light beam having an aperture angle equal to the maximum pivoting angle 2a of the micro-mirrors in all directions,
- a folding unit 42 capable of folding the beam reflected by the reflector 40, in order to generate a light beam having an aperture angle equal to twice the maximum pivoting angle 2α of the micro-mirrors according to a first direction d1 and an aperture angle equal to the maximum pivoting angle 2a of the micro-mirrors in a second direction d2 perpendicular to the first direction d1, and
- a converging lens 44 capable of receiving the light beam reflected by the reflector 40 and the folding unit 42 and of generating a converging light beam. The converging lens has a focal distance f.

The light-emitting diode 14 and the reflector 40 are supported by the folding unit 42.

The folding unit 42 is a folding mirror. The folding unit extends as far as the second focal point of the ellipsoid formed by the reflector 40.

The converging lens is arranged according to an assembly 2F-2F, in other words the converging lens is disposed at a distance equal to twice its focal length f from the focal point of the ellipsoid formed by the reflector 40. The array of micro-mirrors 8 is disposed beyond a distance equal to twice the focal length f of the converging lens 44.

The lighting device 39 according to the second embodiment of the invention advantageously exhibits a single source of light and a single control unit of this light source. This lighting device is more robust, as it comprises a single electrical connection.

Alternatively, the output face of the collimator 16 is planar.

Alternatively, the light-emitting diode 14 is replaced by a plurality of light-emitting diodes aligned one in respect of the others.

Alternatively, the light-emitting diode 14 is replaced by a laser source and, in particular, a laser diode.

The invention claimed is:

1. A motor vehicle lighting system comprising:
   a lighting device to emit a light beam,
   a projection device comprising at least one projection lens,
   an array of micro-mirrors comprising micro-mirrors mounted in a pivoting manner about a pivot axis, said micro-mirrors to receive at least part of the light beam emitted by the lighting device and to reflect at least part of the light beam along a projection axis about a projection axis in a direction of the projection device, each micro-mirror being pivotable to a maximum by an angle, this being referred to as the maximum pivoting angle, wherein the light beam emitted by the lighting device exhibits an angle at an upper vertex greater than the maximum pivoting angle, and wherein the at least one projection lens viewed in a frontal section has a form of a rectangle having a longitudinal side extending in a direction that is substantially parallel to the pivot axis of the micro-mirrors.

2. The lighting system according to claim 1, wherein the angle at the vertex of the light beam emitted by the lighting device is equal to at least 1.3 times the maximum pivoting angle of the micro-mirrors, the at least one projection lens exhibiting in the frontal section a lateral side, a size of the longitudinal side of frontal section of the at least one projection lens being greater than or equal to 1.3 times a size of the lateral side of the frontal section of the at least one projection lens.

3. The lighting system according to claim 1, wherein the angle at the vertex of the light beam emitted by the lighting device is at least equal to twice the maximum pivoting angle of the micro-mirrors, the at least one projection lens exhibiting in the frontal section a lateral side, and wherein a size of the longitudinal side of the frontal section of the at least one projection lens is roughly equal to twice a size of the lateral side of the frontal section of the at least one projection lens.

4. The lighting system according to claim 1, wherein the light beam reflected by the micro-mirrors exhibits a first aperture angle according to a main direction and a second aperture angle different from the first aperture angle in a secondary direction, the second aperture angle being different from the first aperture angle, and wherein said secondary direction is perpendicular to the pivot axis of the micro-mirrors and perpendicular to the projection axis, said main direction being parallel to the pivot axis.

5. The lighting system according to claim 4, wherein the first aperture angle wpm is at least equal to 1.3 times the second aperture angle.

6. The lighting system according to claim 4, wherein said first aperture angle is substantially equal to twice the second aperture angle.

7. The lighting system according to claim 1, wherein the lighting device comprises a first light source to emit light beams extending about a first lighting axis aimed in a direction of the array of micro-mirrors and a second light source to emit light beams extending about a second lighting axis aimed in the direction of the array of micro-mirrors, the first lighting axis and the second lighting axis being disposed in a same lighting plane, an angle substantially equal to the maximum pivoting angle of the micro-mirrors being defined between the lighting plane and the projection axis.

8. The lighting system according to claim 7, wherein the first lighting axis exhibits a lighting angle with said second lighting axis, said lighting angle being substantially lower than or equal to twice said maximum pivoting angle.

9. The lighting system according to claim 1, wherein the lighting device comprises:
   a light source to emit the light beam,
   an ellipsoidal reflector to reflect the light beam to create a light beam with an aperture angle equal to twice the maximum pivoting angle,
   a folding unit to fold the light beam reflected by the reflector, in order to generate a beam having an aperture angle equal to twice the maximum pivoting angle in a first direction and an aperture angle equal to the maximum pivoting angle in a second direction perpendicular to the first direction, and
   a converging lens to receive the light beam reflected by the reflector and the folding unit.

10. The lighting system according to claim 9, wherein said converging lens is located at least at a predefined distance from a focal point of an ellipsis formed by the reflector and from the array of micro-mirrors, the predefined distance being equal to twice a focal distance of the converging lens.

11. A motor vehicle comprising the lighting system according to claim 1.

12. The lighting system according to claim 2, wherein the light beam reflected by the micro-mirrors exhibits a first aperture angle according to a main direction and a second aperture angle different from the first aperture angle in a secondary direction, the second aperture angle being different from the first aperture angle and wherein said secondary direction is perpendicular to the pivot axis of the micro-mirrors and perpendicular to the projection axis, said main direction being parallel to the pivot axis.

13. The lighting system according to claim 2, wherein the lighting device comprises a first light source to emit light beams extending about a first lighting axis aimed in a direction of the array of micro-mirrors and a second light source to emit light beams extending about a second lighting axis aimed in the direction of the array of micro-mirrors, the first lighting axis and the second lighting axis being disposed in a same lighting plane, an angle substantially equal to the maximum pivoting angle of the micro-mirrors being defined between the lighting plane and the projection axis.

14. The lighting system according to claim 2, wherein the lighting device comprises:
   a light source to emit the light beam,
   an ellipsoidal reflector to reflect the light beam to create a light beam with an aperture angle equal to twice the maximum pivoting angle,
   a folding unit to fold the light beam reflected by the reflector, in order to generate a beam having an aperture angle equal to twice the maximum pivoting angle in a first direction and an aperture angle equal to the maximum pivoting angle in a second direction perpendicular to the first direction, and
   a converging lens to receive the light beam reflected by the reflector and the folding unit.

15. A motor vehicle comprising the lighting system according to claim 2.

16. The lighting system according to claim 3, wherein the light beam reflected by the micro-mirrors exhibits a first aperture angle according to a main direction and a second aperture angle different from the first aperture angle in a secondary direction, the second aperture angle being different from the first aperture angle and wherein said secondary direction is perpendicular to the pivot axis of the micro-mirrors and perpendicular to the projection axis, said main direction being parallel to the pivot axis.

17. The lighting system according to claim 3, wherein the lighting device comprises a first light source to emit light beams extending about a first lighting axis aimed in a direction of the array of micro-mirrors and a second light source to emit light beams extending about a second lighting axis aimed in the direction of the array of micro-mirrors, the first lighting axis and the second lighting axis being disposed in a same lighting plane, an angle substantially equal to the maximum pivoting angle of the micro-mirrors being defined between the lighting plane and the projection axis.

18. The lighting system according to claim 4, wherein the lighting device comprises a first light source to emit light beams extending about a first lighting axis aimed in a direction of the array of micro-mirrors and a second light source to emit light beams extending about a second lighting axis aimed in the direction of the array of micro-mirrors, the first lighting axis and the second lighting axis being disposed in a same lighting plane, an angle substantially equal to the maximum pivoting angle of the micro-mirrors being defined between the lighting plane and the projection axis.

19. The lighting system according to claim 3, wherein the lighting device comprises:
 a light source to emit the light beam,
 an ellipsoidal reflector to reflect the light beam to create a light beam with an aperture angle equal to twice the maximum pivoting angle,
 a folding unit to fold the light beam reflected by the reflector, in order to generate a beam having an aperture angle equal to twice the maximum pivoting angle in a first direction and an aperture angle equal to the maximum pivoting angle in a second direction perpendicular to the first direction, and
 a converging lens to receive the light beam reflected by the reflector and the folding unit.

20. The lighting system according to claim 4, wherein the lighting device comprises:
 a light source to emit the light beam,
 an ellipsoidal reflector to reflect the light beam to create a light beam with an aperture angle equal to twice the maximum pivoting angle,
 a folding unit to fold the light beam reflected by the reflector, in order to generate a beam having an aperture angle equal to twice the maximum pivoting angle in a first direction and an aperture angle equal to the maximum pivoting angle in a second direction perpendicular to the first direction, and
 a converging lens to receive the light beam reflected by the reflector and the folding unit.

* * * * *